United States Patent [19]

Rodenbeck et al.

[11] 4,296,784
[45] Oct. 27, 1981

[54] WIRE VIBRATION DAMPING DEVICE AND METHOD FOR COIL WINDING APPARATUS

[75] Inventors: Philip G. Rodenbeck; Fredrick Koenig, both of Fort Wayne, Ind.

[73] Assignee: General Electric Company, Fort Wayne, Ind.

[21] Appl. No.: 88,569

[22] Filed: Oct. 26, 1979

[51] Int. Cl.³ .......................................... H02K 15/04
[52] U.S. Cl. .................................... 140/92.2; 29/596; 242/7.09
[58] Field of Search ......................... 140/92.1, 92.2; 242/7.09; 29/596, 605

[56] References Cited

U.S. PATENT DOCUMENTS

| Re. 29,007 | 10/1976 | Arnold et al. | 140/92.1 |
|---|---|---|---|
| 3,514,837 | 6/1970 | Smith | 140/92.1 X |
| 3,672,027 | 6/1972 | Arnold | 140/92.1 X |
| 3,672,040 | 6/1972 | Arnold | 140/92.1 |
| 3,967,658 | 7/1976 | Arnold | 140/92.1 |

Primary Examiner—Howard N. Goldberg
Assistant Examiner—K. J. Ramsey
Attorney, Agent, or Firm—Ralph E. Krisher, Jr.

[57] ABSTRACT

A wire vibration damping device for use in coil winding machines of the wind and shed type. The device comprises a guide rail which partially or completely encircles the coil form and is connected to the structure which supports the coil form by means of a plurality of downwardly depending guide posts. The guide rail is supported from above the winding plane and includes a downwardly facing lower edge which is located slightly above the winding plane yet sufficiently close to it that it deflects excursions of the wire above the winding plane as it is fed from the flyer thereby damping oscillations of the wire which would otherwise cause improper shedding off the coil form. The support posts for the guide rail are clamped within a bracket mounted to the lower portion of the support structure for the coil form and are vertically adjustable relative thereto so that the position of the guide rail can be fine tuned to ensure optimum damping of the wire oscillations. The guide rail may be rectangular and annular in shape, or may have a generally U-shaped configuration where clearance for the interpole device is necessary.

10 Claims, 7 Drawing Figures

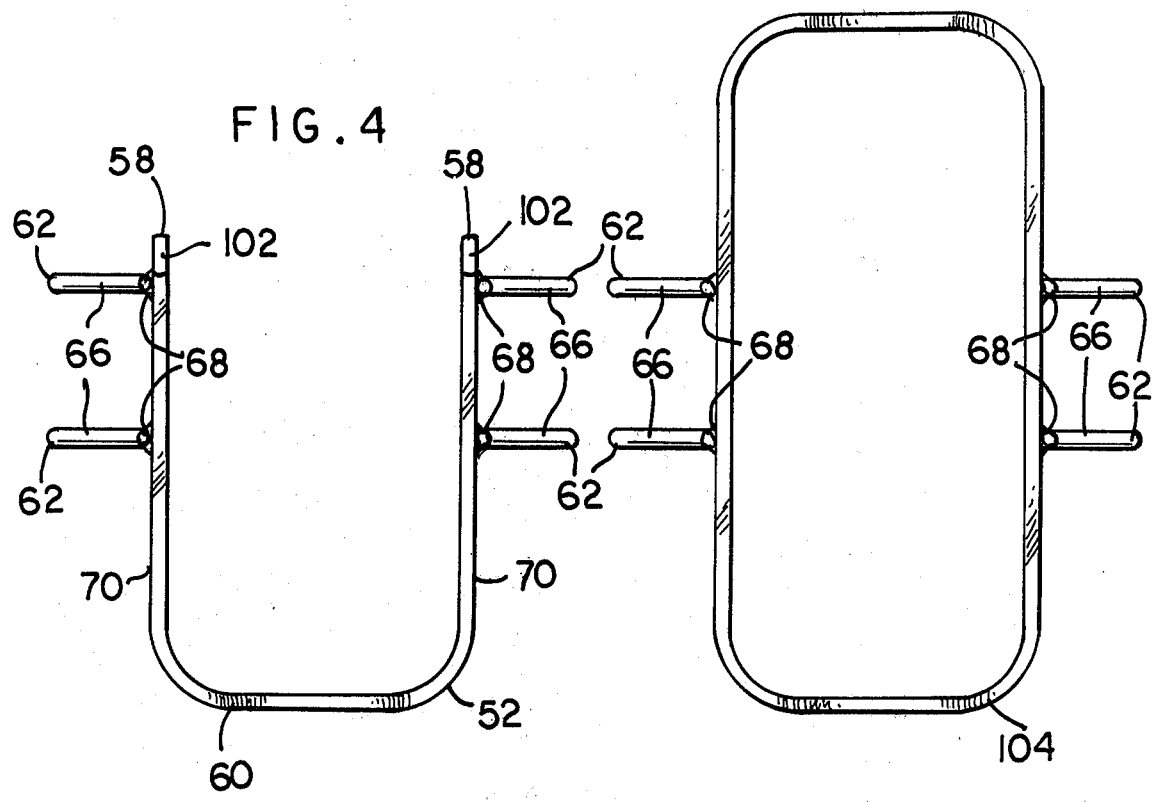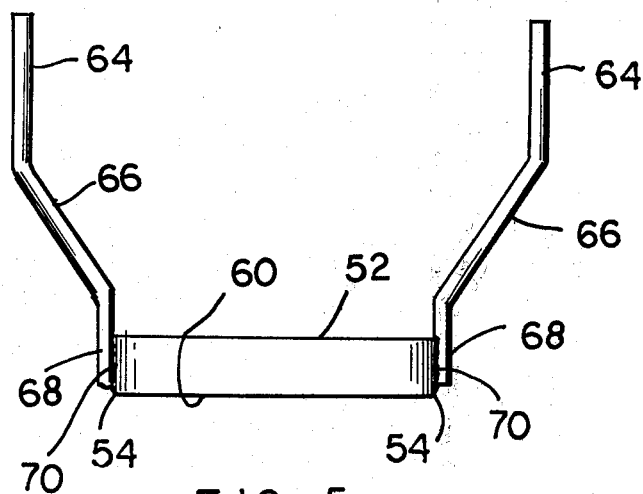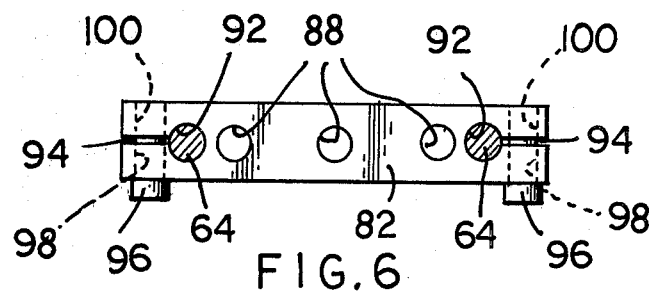

WIRE VIBRATION DAMPING DEVICE AND METHOD FOR COIL WINDING APPARATUS

BACKGROUND OF THE INVENTION

The present invention relates generally to apparatus method for developing wound coils for ultimate insertion into the magnetic cores of electromagnetic devices, and in particular to apparatus for damping vertical oscillations of the wire between the flyer and coil form in coil developing devices of the wind and shed type.

In the manufacture of electric motors, and in particular the stators therefor, it is necessary to form a plurality of coils of wire for ultimate insertion into the slots of the stator. One technique for forming such coils is known as "shedder" or "wind and shed" winding, which comprises holding a stepped coil form assembly in a winding plane while turns of wire are wound thereabout by means of a flyer which rotates about the coil form. Typically, the coil form has a vertical orientation and the flyer rotates about a vertical axis which is generally parallel to the orientation of the coil form.

While turns of wire continue to be generated, at least a portion of the coil form assembly is jumped axially relative to the winding plane and to a winding turn receiving mechanism. Alternatively, the receiving mechanism and coil form assembly may rotate, or the wire dispenser and receiving mechanism may be jumped relative to the coil form assembly. When any of the above procedures are followed, however, a plurality of winding turns will be generated in substantially one given plane. As successive turns are wound onto a coil form section, previously wound turns are moved downwardly, and such turns move from the end of the coil form into the transfer and/or injection tool.

A long recognized problem inherent in the wind and shed technique for developing coils is that of wire oscillation or flutter in directions normal to the winding plane as the wire is drawn out of the rotating flyer. In order for proper development of the individual turns of the coil, it is important that the wire be wound around the coil form in a precisely located position. If the wire is oscillating, however, there is a very good chance that one of the peaks of the oscillation will occur just as the wire is being wound around the coil form, thereby causing it to be wound in interfering relation with the last previous wire turn. This will result in one turn crossing another so that proper shedding action is impaired. This problem is even more serious in the case of coil forms which have crossover steps machined in the back form for the purpose of facilitating the climbing of the wire from one step to the next when the coil form is jumped. If a high excursion of an oscillating wire catches the crossover step, it will be held on the next higher step and then crossed as the next turn is wound around the coil form on the proper step. A wire jam occurs as the coil is moved down into the transfer and/or injection tool resulting in wire breakage and necessitating stoppage of the machine.

One prior art technique for reducing the amplitude of the oscillations between the flyer and coil form is to increase the tension on the wire. The problem with this, however, is that this results in stretching of the wire thereby reducing its cross-section and current carrying capacity. Furthermore, this increased tension work hardens the wire, a situation which is generally to be avoided.

A further proposed solution to the problem of wire oscillation is the provision of a masking plate, which is positioned just beyond the end of the flyer so that it is in close proximity to the winding plane but on the same side of the winding plane as the free end of the coil form. The masking plate includes an opening through which the coil form extends as it is jumped to progressive positions as the larger coils are developed. An example of such a masking plate is disclosed in U.S. Pat. No. 3,514,837, which is owned by the assignee of the present application.

The difficulty with such a masking plate, however, is the fact that there is a portion of the flyer arm which extends below the winding plane, that is, the plane defined by the rotation of the point on the flyer arm at which the wire is discharged and wound on the coil form, and this necessitates that the masking plate be spaced from the winding plane. Even though the spacing of the masking plate from the winding plane may only be on the order of a fraction of an inch, this may be three or four wire diameters, and an oscillation amplitude of this magnitude can easily result in crossing of adjacent turns thereby causing jamming of the wire.

In order to reduce the amount of the clearance between the effective portions of the damping or masking plate in the winding plane, an interference ledge, which is preferably horseshoe in shape, is provided on the masking plate immediately adjacent the winding plane in an attempt to reduce the amplitude of the wire oscillations. Such an interference ledge is disclosed in U.S. Pat. No. 3,967,658, which is owned by the assignee of the present application.

Although the interference ledge described above is effective in reducing the amplitude of the oscillations, its effectiveness is directed primarily to those excursions of the wire out of the winding plane in a direction toward the free end of the coil form which, in the case of most winding apparatus of this type, is in the downward direction. Excursions of the wire in an upward direction, that is, toward the winding head and the larger steps of the coil form, are still a significant problem. It is believed that this is due primarily to the fact that, as the wire is fed through the flyer arm, which may be tubular in nature, it makes an abrupt turn just before the point of discharge from the flyer arm. The tendency of the wire to follow the radius of curvature established by the bend in the flyer tube or around the flyer pulley, causes it to fly above the winding plane and then return to or below the winding plane so as to form a wave in the wire above the winding plane which causes the wire to oscillate. Thus, in order to most effectively damp the oscillations of the wire, it is necessary to reduce the amplitude of the oscillations above the winding plane, rather than below the winding plane, as is done with the aforementioned masking plate with, or without, the interference ledge.

A further problem with the prior art masking plates is that they restrict access to the coil form in the event maintenance or the clearing of a wire jam is necessary.

The wire vibration dampener according to the present invention is suitable for use on a wide variety of prior art coil winding apparatus of the wind and shed variety. The following U.S. patents, which are owned by the assignee of the present application, are examples of such apparatus: U.S. Pat. Nos. 3,514,837; 3,672,040; 3,672,027; 3,765,080; and Re. 29,007. These patents are expressly incorporated by reference into the present application, as are the entire disclosures of each of them.

SUMMARY OF THE INVENTION

The present invention overcomes the above-discussed deficiencies of the prior art attempts at solving the problem of wire vibration between the flyer and coil form by providing a damping element which is positioned above, rather than below, the winding plane. That is, the element is supported by structure which is around the coil form and above the winding plane and presents a surface to the wire being pulled off the flyer which is in close proximity to but slightly above the winding plane and without the path of rotation of the flyer arm. Although in most winding apparatus of the wind and shed type, the damping element would be located above the winding plane, if the apparatus were oriented such that the coils were developed by winding in a vertical plane, as disclosed in the aforementioned U.S. Pat. No. 3,514,837, then the damping element would be located on the opposite side of the winding plane as the free end of the coil form.

Specifically, the damping element is in the form of a rectangular annular or U-shaped guide rail which encircles or partially encircles the coil form and has a lower edge which is positioned just above the winding plane. The guide rail is secured to the winding head assembly by means of a plurality of support posts, which may be welded or otherwise secured at one end to the guide rail, and clamped at the other end to a bracket assembly, which in turn is secured to a convenient portion of the winding head assembly. In order to permit the damping effect of the rail to be fine tuned so as to minimize oscillations in the wire, the posts are preferably adjustably secured to the bracket so that the vertical position of the guide rail and post assembly may be varied.

The guide rail is provided with a highly polished lower edge and corners which are rounded so that the possibility of scoring and denting the wire as it contacts the lower edge is minimized. In the case of the U-shaped embodiment, the free ends of the guide rail are formed as cam surfaces which serve to deflect the wire downwardly in the event it should strike the ends of the rail as it is wound around the coil form. The U-shaped embodiment is used in those applications where clearance is necessary for the interpole device.

The bracket assembly for securing the vibration dampener to the winding head is preferably formed in two parts so that it can be assembled around the upper supporting structure for the coil form without the necessity for removing the coil form itself.

Specifically, the present invention contemplates apparatus for forming coils of wire comprising a coil form support structure, and a coil form adapted for having wire coiled thereon, which is connected to and supported by the support structure and has a free end. A flyer rotatable about the coil form winds coils of wire around the coil form, and has a wire discharge point from which wire is fed directly onto the coil form. The discharge point rotates in a winding plane which, generally, is coincident with the location on the coil form on which the wire is wound. A wire vibration damping device is provided having a surface at least partially encircling the coil form and defining a plane parallel and in close proximity to the winding plane on the opposite side of the winding plane as the free end of the coil form. The surface is inside the path of rotation of the flyer and serves to deflect oscillations of the wire which occur on the side of the winding plane opposite the free end of the coil form.

The present invention further contemplates apparatus for forming coils of wire comprising a coil form adapted for having wire coiled thereon, a flyer rotatable about the coil for winding coils of wire around the coil form wherein the flyer includes a flyer arm having a wire discharge point which rotates in a fixed winding plane and from which wire is fed directly onto the coil form. The flyer arm includes wire guide means therein for guiding the wire along a path within which the wire is cause to make a turn about an imaginary center of rotation just prior to exiting the arm at the wire discharge point, and this imaginary center of rotation is located on one side of the winding plane. A wire vibration damping device includes a wire deflection surface which at least partially encircles the coil form and is located on said one side of the winding plane.

The objects and advantages of the present inventon will be best understood by reference to the following detailed description, taken together with the accompanying drawings.

BRIEF DESCRIPTION OF THE DRAWINGS

FIG. 4 is a bottom view of the guide rail and support posts according to one embodiment of the invention;

FIG. 5 is a side elevational view thereof;

FIG. 6 is a plan view of one of the mounting brackets wherein the support posts are shown clamped therein; and FIG. 7 is a bottom view of the guide rail and support posts according to a second embodiment of the invention.

DETAILED DESCRIPTION

Figure 1:
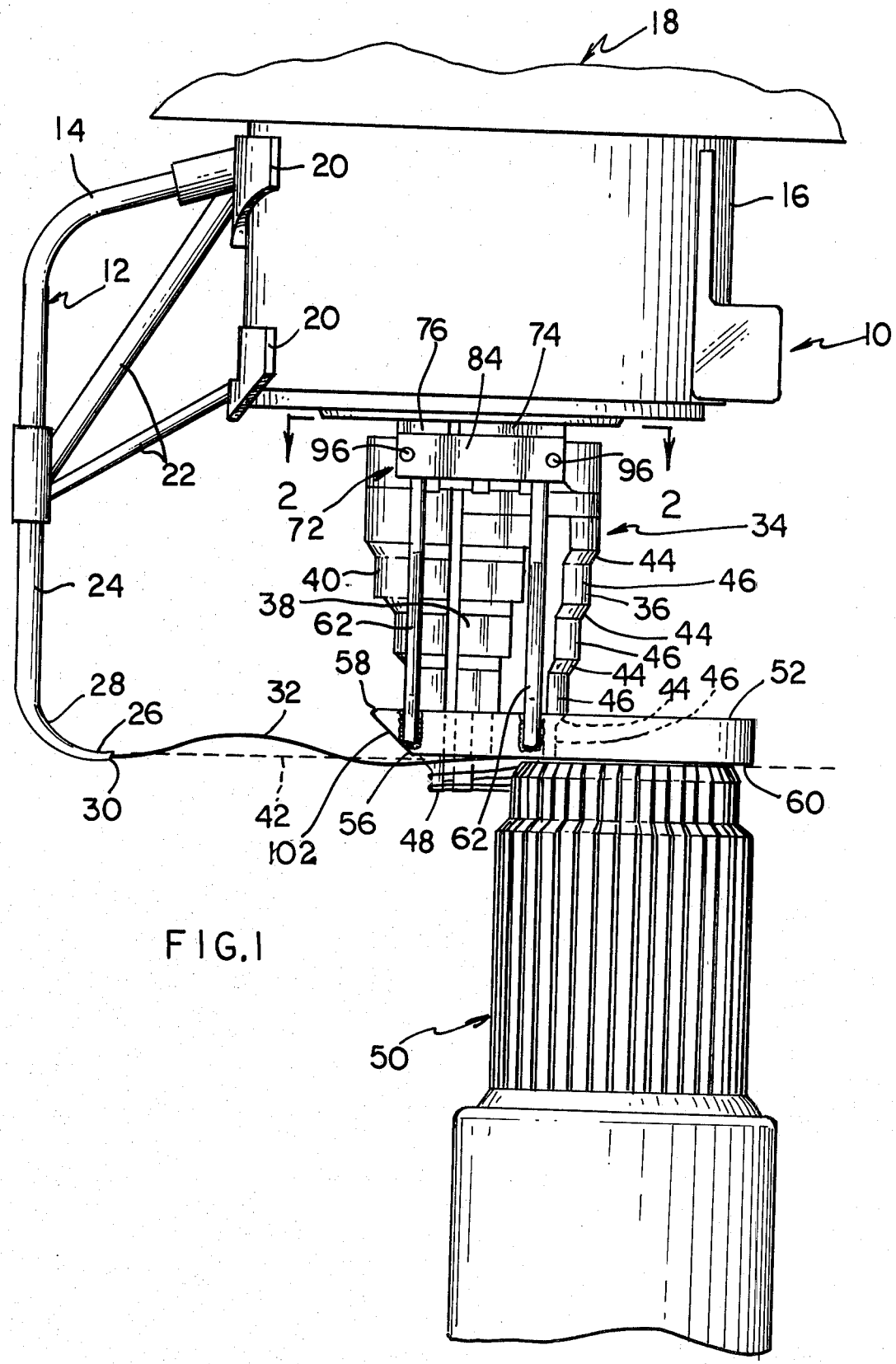
FIG. 1 is a front elevational view in somewhat diagrammatic form of a winding apparatus provided with a wire vibration dampener according to the present invention.
Figure 2:
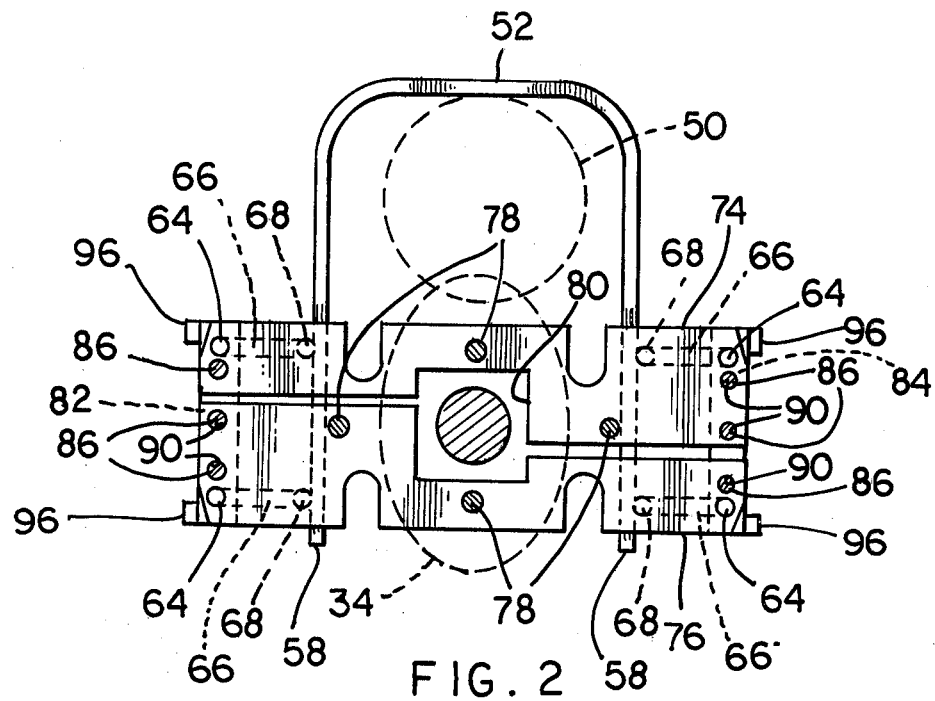
FIG. 2 is a fragmentary sectional view taken along line 2—2 of FIG. 1 and viewed in the direction of the arrows.

With reference now to the drawings, there is illustrated in FIG. 1 a portion of a coil winding apparatus 10 of the wind and shed type comprising a flyer 12 having a tubular flyer arm 14 connected to rotatable barrel 16, which is part of the winding head indicated generally as 18, by means of brackets 20 and support arms 22. Tubular flyer arm 14 comprises a generally vertical portion 24, a generally horizontal portion 26 joined to vertical portion 24 by an integral, curved portion 28, and a discharge opening 30 from which the wire 32 is drawn. Curved section 28 causes the wire within arm 14 to undergo a travel path which bends about an imaginary axis of rotation located above the level of discharge opening 30. Although flyer arm 14 has been illustrated as tubular in nature, the present invention is not so limited and is intended to include flyer arms of other configurations, such as those wherein the wire is drawn around a pulley at the lower end of the flyer arm and is wound around the coil form directly from the pulley. Such a flyer arm is described in U.S. Pat. No. 3,514,837.

The flyer 14 rotates about coil form assembly 34 which comprises a stepped front section 36, a stepped middle section 38 and a stepped rear section 40, wherein certain of the coil form sections 36, 38 and 40 are movable horizontally through the winding plane. The winding plane, which is indicated by reference numeral 42, is the plane defined by the discharge opening 30 of flyer arm 14 as it rotates about coil form 34. As the flyer arm 14 rotates about coil form 34, wire is drawn through flyer arm 14 out discharge opening 30 and is wound around coil form 34 in the aforementioned winding plane 42. Depending on the axial position of coil form 34, the turns are wound on the tapered or bevelled transition portions 44 between adjacent steps 46. Due to the tapered nature of the surfaces 44, as each turn of wire is wound around coil form 34, it will push the previously wound turn downwardly, and after a given number of turns are developed, they will drop off the free end 48 of coil form 34 into transfer and/or injection tool 50 for subsequent injection into the slots of a motor stator (not shown). As is well known, coil form 34 is incrementally jumped downwardly into tool 50 so that steps 46 of increasing diameter are positioned within the winding plane 42. By this procedure, coils of larger diameter are successively developed.

As the flyer arm 14 rotates about a vertical axis generally coincident with the coil form 34, the moving wire 32 extending from the flyer arm discharge point 30 to the coil form assembly 34 tends to oscillate and vibrate in an axial direction so that the wire 32 is no longer confined to the winding plane 42 as it moves toward the coil form assembly 34. It is believed that this oscillation is caused primarily by the fact that the wire, as it moves through winding arm 14, tends to follow the radius of curvature defined by the curved section 28 so that as it leaves the discharge opening 30, it forms a bowed travel path as shown in FIG. 1, which sets up oscillations in the wire 32 between flyer arm 14 and coil form assembly 34. The problems which are caused by such oscillations in wire 32 have been discussed above.

In order to damp these oscillations, the illustrated head 18 includes a damping element which, according to one embodiment of the invention, is in the form of a U-shaped guide rail 52, which is shown in FIGS. 1, 2, 4 and 5. Guide rail 52 is formed of hardened steel and of a size such that, for the particular winding apparatus 10 in question, it will partially encircle coil form 34. In order to prevent denting and scoring of the wire 32 when it contacts guide rail 52, the lower corners 54 thereof are rounded and polished as are the lower corners 56 of the free ends 58. This embodiment of the guide rail 52 is open-ended so as to provide clearance for the movement of the interpole device (not shown) within the winding path of the wire 32. Furthermore, the lower edge 60 of guide rail 52, which is the surface contacted by the oscillating wire 32 as it is wound around coil form assembly 34, is also highly polished, again for the purpose of preventing scoring of the wire 32.

Guide rail 52 is supported by means of four support posts 62, each of which is generally offset, as shown in FIG. 5, and comprises an upper portion 64, an intermediate portion 66 integral with and angularly disposed relative to upper portion 64, and a lower portion 68, which is integral with and annularly disposed relative to intermediate portion 66. The lower portions 68 of each of the support posts 62 are welded to the outer surface 70 of guide rail 52 as illustrated in FIG. 4.

Support posts 62 are connected to the support structure for the coil form 34, which is within rotating drum 16. It should be noted, however, that the particular location for attachment of the vibration damping device will depend upon the particular construction of the winding apparatus on which the device is installed. Mounting of the device is accomplished by means of a bracket assembly 72 (FIG. 2), which comprises a split bracket having bracket halves 74 and 76, which are secured to the underneath side of the winding head 18 by means of four screws 78. It will be noted that bracket halves 74 and 76 are shaped such that they define, when assembled, an opening 80 which is adapted to straddle the upper portion of the support structure for the coil assembly 34. Since the bracket is split, it can be installed without the necessity for removing coil form assembly 34.

A pair of mounting brackets 82 and 84 are secured to bracket halves 74 and 76 by screws 86, which extend through openings 88 (FIG. 6) of mounting brackets 82 and 84 from underneath, and are received within corresponding aft openings 90 in the bracket halves 74 and 76.

With particular reference to FIG. 6, the upper portions 64 of support posts 62 are received within corresponding openings 92 in mounting brackets 82 and 84. The ends of mounting brackets 82 and 84 are slotted at 94 and the upper portions 64 of support posts 62 are clamped within openings 92 by drawing the slotted end portions together by means of socketed cap screws 96, which are received within openings 98 and threaded into tapped openings 100. This arrangement permits a certain amount of vertical adjustment for guide rail 52 so that its lower edge 60, which defines a plane parallel to the winding plane 42, may be adjusted in a precisely located position above and in close proximity to the winding plane. This adjustment is accomplished by loosening screws 96, sliding support posts 62 upwardly or downwardly within openings 92, and then retightening screws 96 so as to lock the guide rail 52 in the desired vertical position. Although a particular arrangement for mounting the guide rail 52 has been described, the present invention is not so limited and is intended to encompass other ways of accomplishing the same result.

In operation, as flyer arm 14 rotates about coil form assembly 34, oscillations in wire 32, particularly those oscillations which extend above the winding plane as illustrated in FIG. 1, will strike the lower edge 60 of guide rail 52 and be deflected downwardly so as to return to the winding plane 42. The net result of this action is to damp the oscillations within wire 32 so that proper winding and shedding action will occur. In the U-shaped embodiment illustrated in FIGS. 1, 2, 4 and 5, the free ends 58 of guide rail 52 are formed with generally downwardly facing cam surfaces 102 which are intended to deflect the wire 32 downwardly if it should strike the surface 102 as the flyer arm 14 is rotating about the back portion of coil form assembly 34. Like lower edge 60, cam surfaces 102 are highly polished and hardened.

For certain configurations of the winding apparatus on which the dampening device is installed, the guide rail 104 may also be formed in an annular, rectangular configuration as illustrated in FIG. 7. Guide rail 104 has the same characteristics as guide rail 52, except that it includes an additional integral section which completes the annulus. In some cases, it may be desirable to narrow the width of guide rail 104 so as to provide clearance for the interpole device. In this embodiment, the guide rail 104 would completely encircle the coil form assembly 34.

Figure 3:
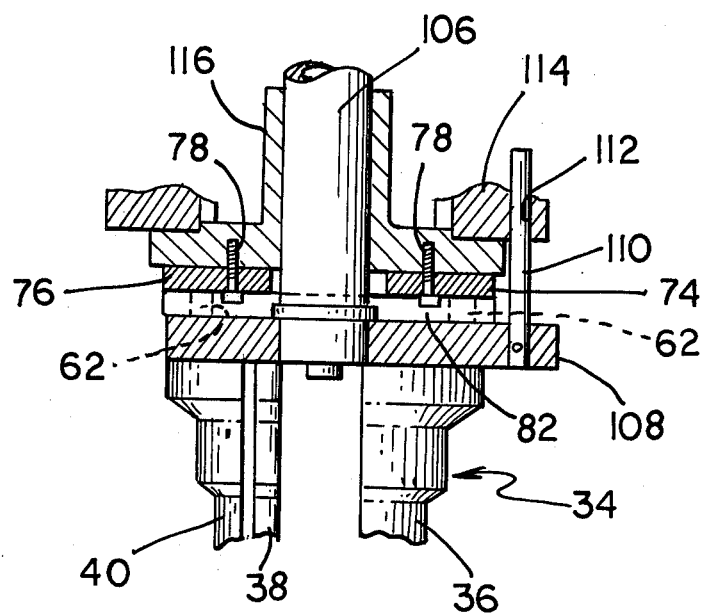
FIG. 3 is a fragmentary, sectional view of a coil form and its supporting structure showing the manner in which the wire vibration damping device according to the present invention can be mounted.

By way of further example, FIG. 3 illustrates the manner in which the device would be mounted to the coil winding apparatus disclosed in U.S. Pat. No. Re. 29,007. Sleeve bearing 116 supports the base plate 108 of coil form 34, and base plate 108 is prevented from rotating relative to its support structure by means of pin 110, which is connected to base plate 108 and extends through an opening 112 in support structure 114. Split bracket halves 74 and 76 are connected to sleeve bearing 116 by screws 78.

It will be appreciated that the wire vibration dampener comprising guide rail 52 and support posts 62 is disposed completely above the winding plane 42 so as to permit the flyer arm 14 to rotate. Since the damping element is in the form of a narrow guide rail 52, easy access to coil form assembly 34 may be had, as opposed to prior art masking plates wherein access was quite difficult.

The present invention is not limited to any particular shape for guide rail 52 or guide rail 104. Furthermore, the damping device is suitable for installation on winding machines wherein the winding axis is horizontal rather than vertical.

In some cases, it may be desirable to employ the vibration damping device of the present invention together with a prior art masking plate.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed as new and is desired to be secured by Letters Patent of the United States is:

1. Apparatus for forming coils of wire windings for electric motors, said apparatus comprising: a coil form support structure, a coil form adapted for having wire wound thereabout, said coil form being connected to and supported by said support structure and having a free end, flyer means rotatable about said coil form for winding turns of wire about said coil form, said flyer means having a wire discharge point from which wire is fed directly about said coil form, the discharge point rotating in a winding plane, and a wire vibration damping device having a surface at least partially encircling said coil form and which defines a plane parallel and in close proximity to the winding plane on the opposite side of the winding plane as the free end of the coil form, said surface being inside the path of rotation of said flyer.

2. The apparatus of claim 1 wherein said damping device includes a support connected to said coil form support structure.

3. The apparatus of claim 2 wherein said damping device comprises a part annular guide rail member, said support comprises a plurality of posts connected to said rail member and to said coil form support structure, and said surface is a lower edge of said rail member.

4. The apparatus of claim 2 wherein said damping device comprises an annular guide rail member, said support comprises a plurality of posts connected to said rail member and to said coil form support structure, and said surface is a lower edge of said rail member.

5. The apparatus of claim 1 wherein said damping device comprises a generally U-shaped guide rail member connected to said coil form support structure by support elements extending alongside said coil form, wherein said surface is a lower edge of said rail member, and wherein said guide rail member includes end portions having cam surface means facing towards the winding plane adapted for deflecting downwardly any wire which contacts the cam surface means as such wire is wound about the coil form.

6. Apparatus for forming coils of wire windings for electric motors, the apparatus comprising: a coil form adapted for having wire wound thereabout; flyer means rotatable about said coil form for winding turns of wire about said coil form, said flyer means including a flyer arm having a wire discharge point which rotates in a fixed winding plane and from which wire is fed directly about the coil form, said arm further including wire guide means therein for guiding wire along a path in which the wire is caused to make a turn about a center of curvature just prior to exiting the arm at the wire discharge point, the center of curvature being located on one side of the winding plane; and a wire vibration damping device having a wire deflection surface which at least partially encircles said coil form and which is located on said one side of said winding plane.

7. The apparatus of claim 6 wherein said damping means comprises a guide rail and said deflection surface is a lower edge of said guide rail, said guide rail being disposed inside the path of rotation of said flyer means.

8. The apparatus of claim 6 wherein said flyer arm rotates about a vertical axis and includes a first portion extending generally vertically in a downward direction and a second portion connected to said first portion and which extends generally horizontally towards said coil form, said second portion terminating in said discharge point, and said damping device is located above the winding plane.

9. The apparatus of claim 8 wherein said first and second portions of said flyer arm comprise connected first and second tubular members, respectively, through which the wire runs, and the second tubular member terminates at said wire discharge point.

10. In a method of forming coils of wire for electric motor windings, the method comprising generating a plurality of turns of wire about coil form means by dispensing wire thereabout and moving at least some turns of a given coil along the coil form means toward and into turn receiving means while at least one other turn for the same coil is being generated, and wherein all of the turns are generated in the same general winding plane, by a flyer arm that guides wire along a path in which the wire is caused to make a turn with respect to a center of curvature prior to exiting the arm at the wire discharge point, wherein the center of curvature is located on one side of the winding plane, the improvement comprising: interfering with oscillatory wire movement on said one side of the winding plane and thereby damping oscillations of the wire while the turns are being generated.

* * * * *